(12) United States Patent
Tolle (10) Patent No.: US 9,519,853 B2
(45) Date of Patent: Dec. 13, 2016

(54) WEARABLE, NON-VISIBLE IDENTIFICATION DEVICE FOR FRIENDLY FORCE IDENTIFICATION AND INTRUDER DETECTION

(71) Applicant: James P Tolle, Charlottesville, VA (US)

(72) Inventor: James P Tolle, Charlottesville, VA (US)

(*) Notice: Subject to any disclaimer, the term of this patent is extended or adjusted under 35 U.S.C. 154(b) by 477 days.

(21) Appl. No.: 14/069,586

(22) Filed: Nov. 1, 2013

(65) Prior Publication Data

US 2015/0123767 A1    May 7, 2015

(51) Int. Cl.
*G06K 19/077* (2006.01)
*G06Q 10/00* (2012.01)
*G01S 17/74* (2006.01)

(52) U.S. Cl.
CPC ......... *G06K 19/07758* (2013.01); *G01S 17/74* (2013.01); *G06Q 10/00* (2013.01)

(58) Field of Classification Search
CPC ... G06K 19/07758; G06Q 10/00; G01S 17/74; G01S 13/78; G01S 1/70; H04B 10/00; H04B 10/02
USPC .................................. 340/539.12, 5.81, 321
See application file for complete search history.

(56) References Cited

U.S. PATENT DOCUMENTS

| | | |
|---|---|---|
| 4,694,297 A | 9/1987 | Sewards |
| 4,837,568 A | 6/1989 | Snaper |
| 4,851,849 A | 7/1989 | Albersdoerfer |
| 4,955,000 A | 9/1990 | Nastrom |
| 5,056,141 A | 10/1991 | Dyke |
| 5,229,764 A | 7/1993 | Matchett |

(Continued)

FOREIGN PATENT DOCUMENTS

| | | |
|---|---|---|
| EP | 0138525 A2 | 4/1985 |
| GB | 1044443 A | 9/1986 |
| WO | WO2012039712 A1 | 3/2012 |

OTHER PUBLICATIONS

Dyster, J. (May 2011) Advancements in modular wearable computing solutions for the dismounted, Government Security News, May 2011, pp. 1-2.

*Primary Examiner* — Albert Wong (57) ABSTRACT

A wearable, non-visible identification device that provides reliable, tamper proof, friendly-force identification and intruder detection. The device is integrated as a part of the wearer's uniform and includes a user input surface for periodic entry of a unit- or user-defined pass code. A timeout capability prevents the device and its identification signal from being used if the pass code is not entered within the specified time period. The preferred embodiment uses non-visible optical identification signals for 1-way identification using standard tactical equipment, making the device useful in the field during operations or at temporary security control points away from established bases. Alternative embodiments use radio-frequency, visible and reflective identification signals. All embodiments use identification signaling methods which are effective at safe stand-off distances to minimize the threat to security personnel. The device also supports identification at tactical distances to support identification in the field. Very low cost and low power embodiments for use by security forces in developing nations are described. This invention provides a novel and improved means for defeat of the threat of adversaries or insurgents exploiting stolen or fake uniforms to attack friendly forces.

14 Claims, 5 Drawing Sheets

(56) References Cited

U.S. PATENT DOCUMENTS

| | | |
|---|---|---|
| 5,274,379 A | 12/1993 | Carbonneau |
| 5,299,227 A | 3/1994 | Rose |
| 5,414,405 A | 5/1995 | Hogg |
| 5,459,470 A | 10/1995 | Wootton |
| 5,648,862 A | 7/1997 | Owen |
| 5,686,722 A | 11/1997 | Dubois |
| 5,819,164 A | 10/1998 | Sun |
| 5,929,777 A * | 7/1999 | Reynolds ............. G01S 1/70 250/339.14 |
| 5,966,226 A | 10/1999 | Gerber |
| 5,973,598 A | 10/1999 | Beigel |
| 5,973,600 A | 10/1999 | Mosher, Jr. |
| 6,018,739 A | 1/2000 | McCoy |
| 6,097,330 A | 8/2000 | Kiser |
| 6,119,096 A | 9/2000 | Mann |
| 6,421,453 B1 | 7/2002 | Kanevsky |
| 6,593,852 B2 | 7/2003 | Gutta |
| 6,655,585 B2 | 12/2003 | Shinn |
| 6,701,649 B1 | 3/2004 | Brosi |
| 6,816,106 B1 | 11/2004 | Butler |
| 6,871,287 B1 | 3/2005 | Ellingson |
| 7,196,655 B1 | 3/2007 | Hayles, Jr. |
| 7,204,425 B2 | 4/2007 | Mosher, Jr. |
| 7,224,308 B2 | 5/2007 | Butler |
| 7,308,202 B2 | 12/2007 | Roes |
| 7,316,358 B2 | 1/2008 | Kotik |
| 7,336,189 B1 * | 2/2008 | Thomas ............ G08B 21/0211 340/539.12 |
| 7,365,536 B2 | 4/2008 | Crowley |
| 7,494,061 B2 | 2/2009 | Reinhold |
| 7,505,562 B2 | 3/2009 | Dinca |
| 7,593,506 B2 | 9/2009 | Cason |
| 7,605,709 B2 | 10/2009 | Tolliver |
| 7,796,733 B2 | 9/2010 | Hughes |
| 7,796,734 B2 | 9/2010 | Mastronardi |
| 7,809,109 B2 | 10/2010 | Mastronardi |
| 7,831,150 B2 | 11/2010 | Roes |
| 7,849,619 B2 | 12/2010 | Mosher, Jr. |
| 7,889,053 B2 | 2/2011 | McGrath |
| 7,898,385 B2 | 3/2011 | Kocher |
| 7,983,565 B2 | 7/2011 | Varshneya |
| 8,111,156 B2 | 2/2012 | Song |
| 8,115,697 B2 | 2/2012 | Hayles, Jr. |
| 8,135,112 B2 | 3/2012 | Hughes |
| 8,184,981 B2 | 5/2012 | Ivtsenkov |
| 8,405,518 B2 | 3/2013 | Corwin |
| 8,462,042 B2 | 6/2013 | DeLong |
| 8,831,429 B2 | 9/2014 | Maryfield |
| 2012/0056048 A1* | 3/2012 | Yamvrias ............. F16B 39/00 248/74.1 |
| 2013/0109427 A1* | 5/2013 | Matus ................. G08B 21/025 455/521 |
| 2015/0250419 A1* | 9/2015 | Cooper ............... A61B 5/6804 600/301 |
| 2015/0265860 A1* | 9/2015 | Kennedy ............. F16B 45/02 182/3 |
| 2015/0294514 A1* | 10/2015 | McCollum ......... G07C 9/00111 340/5.81 |

* cited by examiner

Fig. 1

Fig. 2a
(Front)

Fig. 2b
(Back)

WEARABLE, NON-VISIBLE IDENTIFICATION DEVICE FOR FRIENDLY FORCE IDENTIFICATION AND INTRUDER DETECTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to all documentation described below and to all drawings accompanying and made part of this document: © 2013 James Tolle.

BACKGROUND OF THE INVENTION

Field of the Invention

The field of the invention is personnel screening, intruder detection and combat identification.

The problem of screening unauthorized personnel from large organizations or military perimeters is complicated when potential intruders or adversaries obtain access to organizational clothing or uniforms. Even situations in which personnel security badging can be used to identify unauthorized personnel onsite, the use of stolen or fake uniforms can allow intruders to approach close enough to cause great harm to access point and other personnel. The threat is even greater in the field where adversaries posing as friendly forces can approach formations and inflict many casualties. Security controls and safe distances can be compromised when personnel rely on the organizational clothing or uniforms as a first level of screening for personnel who are not close enough for inspection of personnel security badging.

This problem is particularly costly in police and military situations and has been the basis of many casualties caused by intruders or insurgent forces who have gained access to the uniforms of indigenous or allied forces. This has often led to deadly results with the increase in suicide improvised explosive attacks within the last few decades. These type of attacks threaten security forces in all settings, including highly secure locations such as police stations and military compounds as well as during operations in the field. In all parts of the world, intruders who have access to police or military uniforms can cause great harm. For many years, police and military forces have relied on personnel security badging and screening to identify unauthorized personnel who are wearing official uniforms. Governments in many parts of the world have also established controls over the sources of supply for official uniforms in order to reduce the vulnerability of their security forces. More advanced militaries have relied on advanced technology to mitigate these threats. This includes friendly force or combat identification systems during operations in the field and various camera, biometric, and other personnel screening technologies at security checkpoints or at the access points to secure compounds. Many security controls which have reduced this threat in more advanced countries have not been able to be widely used in less developed countries because of cost or complexity. It is also difficult to rely on the control of uniform sources of supply in many developing parts of the world because of a lack of infrastructure or poorly developed civilian or military administration systems in these parts of the world. It is also true that the opportunity to rely on advanced technology or even simple uniform control procedures to reduce these threats is greatly diminished when conflict is ongoing in a country where a government does not exert control over all areas or where an international force is working with local authorities to train local security forces and re-establish security throughout a region.

Inventions in the prior art concerning personnel identification and screening or other technologies have not fully addressed these problems. In particular, the continuing number of security personnel who are being killed routinely throughout the world by adversaries or insurgents wearing friendly uniforms underscores that past inventions have not directly addressed this problem nor aided people with normal skill in the field to find an effective solution. The present invention believes that the most effective solution to this problem is a novel use of a technology that can be integrated and worn with the uniforms, that is itself very low cost and also does not require expensive technology to use. It is important that a solution based on a wearable technology which is tied to the authorized uniform be used to address the problem when uniforms are obtained illegitimately by hostile forces or individuals. Past inventions which are centered on the authorized users but not a part of the uniforms will suffer from unauthorized personnel obtaining official uniforms when they are not worn by the intended security personnel (for example, lost or stolen from the laundry). Low cost is very important for a uniform-based solution because of the number of uniforms in use. In addition to the use of wearable technology attached to the uniform, another important aspect of a solution which is effective at all times will be one which can be used with normal equipment available to security forces both in the garrison as well as in the field during operations. Complex or costly technology used for screening in advanced and developed nations will not work in most parts of the world with existing resources and training of those security forces. An additional aspect of an invention which solves this problem is that the application of the technology must be tamper proof. The invention will not solve the problem caused by adversaries or insurgents if it does not provide protections against tampering by those forces.

Description of Related Art

The following discussion of past personnel identification and screening approaches in the prior art explains how these approaches do not adequately address the problem nor disclose a means of addressing this problem by someone skilled in the art. In each case, the unique aspects of the problem at hand which are not addressed in the prior art and are only addressed with the novel approach disclosed in the current invention are explained.

Access Point Control Technology

A number of past inventions provide inventions for devices or methods to be used when screening personnel at access points. Many of these inventions rely on either advanced sensing systems, advanced terminal technologies (card readers, computer terminals, etc.), or both for improved identification and screening. The advanced sensing systems rely on 2-way signals (receive+transmit) or interrogation and response, such as x-ray, laser, magnetic anomaly, nuclear resonance or other 2-way means. These systems require equipment and technology which is not supported by security forces or their training in many parts of the world. Similarly, the access control inventions which rely on special terminal equipment such as card readers or computer and software are not easily implemented in many parts of the world. Additionally, these inventions do not address the need for intruder detection during field operations. All of the inventions in this category are by their nature designed for an improved access control point where conditions are much different than those in the field. For this reason, none of these inventions will address the identification and detection needs in the field in most cases. The current invention includes a novel combination of features which uniquely address detection of intruders wearing unauthorized or compromised uniforms far beyond what the technology in the prior art alone can. The 1-way identification signal of the current invention which is integrated with the uniform and provides pass code protection, timeout and tamper proof protections against a threat at a distance prevents an intruder from exploiting a compromised identification signal that other access point technology would pass without detection or would allow an intruder the proximity within safe distances to do great harm. The simplicity of the current invention and its intended use with existing tactical equipment further enhances the usefulness of the invention, but the novel combination of features which makes this invention ideally suited to eliminate a threat from an intruder in a uniform sets it apart from the prior art in this category. The current inventor believes that all access control inventions methods and technology to-date fail to incorporate the novel features of the current invention which are uniquely designed to address this threat at an access point where other inventions in the prior art are not. The following are examples from recent prior art which demonstrates this. A note is provided next to each to explain what technology is used in the prior art in place of the novel combination in the current invention.

U.S. Pat. No. 8,111,156, Song (pyro sensors, microphones & accelerometers), U.S. Pat. No. 7,898,385, Kocher (RF, imaging & body position), U.S. Pat. No. 7,605,709, Toliver (biometrics, x-ray, pulse induction, ion mobility spectrometry & document scanning), U.S. Pat. No. 7,365,536, Crowley and Lathrop (magnetic anomaly, nuclear sensors, metal detector), U.S. Pat. No. 6,421,453, Kanevsky et. al. (biometric, gestures & password authentication), U.S. Pat. No. 5,056,141, Dyke (word-pair voice recognition), European patent CN102324010, Huaijiang et. al. (RF & optical frequency), US patent application 2010219241, Corwin et. al. (id card & bar code), European patent EP0138525, Rudland (IR card reader), European patent EP2619558, Rayner (x-ray), European patent application MX2012010644, Katowski et. al. (x-ray), European patent application MX2012010642, Gray et. al. (x-ray), U.S. Pat. Nos. 8,135,112 and 7,796,733, Hughes (both x-ray), U.S. Pat. Nos. 7,809,109, 7,796,734, 7,593,506 and 7,505,562, Mastronardi et. al. (all x-ray), U.S. Pat. No. 7,889,053, McGrath et. al. (Microwave biometrics)

Each of these examples in the prior art clearly suffer from using identification or screening technology which does not provide safe distance needed to defeat the threat of intruders who are intending to cause harm. All of these methods and inventions are also costly, complex or advanced technologies which are not available to most security forces throughout the world. In addition to these more easily disposed cases in the prior art, U.S. Pat. Nos. 7,849,619, 7,204,425, and 5,973,600, Mosher et. al., disclose a series of inventions proposed for personnel screening and identification which require further discussion. In the Mosher prior art, an identification appliance is described which can be "worn" by individuals. However, the means of wearing described in the Mosher prior art is based on a band which can be worn on the wrist, arm, ankle, neck, etc. and it is not described as a device which is integrated as part of the user's uniform. Mosher also provides for the use of non-visible identification signals, including optical and radio-frequency signals. However, the inventions are designed for personnel screening and all are intended to be read at close distance. Mosher recognizes that a wearable device based on a band can be easily pilfered and suffer tampering. He includes tamper-proofing of the apparatus based on connections and electrical signals in his description and claims. His prior art includes password and Personel Identification Number (PIN) protection and tamper-proofing connections and couplings in the description, but not in the claims. Several of these features are similar to the current invention. However, Mosher's prior art fails to include all of the key features which are needed to defeat the threat posed by intruders in stolen or fake uniforms. Most notably, Mosher fails to disclose the novel combination of a password-protected, tamper-proof identification signal with a device which is integrated as part of a user's uniform and which supports identification at safe ranges. Without combining the non-visible identification signal which has PIN-protection and tamper-proofing with a means to integrate the identification function with the uniform and also support identification at safe distances, Mosher fails to effectively address the real-world problems presented by intruders. The current invention's novel combination of all of these features addresses this threat where Mosher fails.

Biometric Screening Technology

Biometric screening can be an effective means of identification at close range. However, these methods do not meet the need to identify intruders at safe distances in access control points nor do they provide effective means to provide friendly force identification at tactical ranges in the field. The novel aspects of the current invention which allow friendly force identification and intruder detection at stand off or tactical distances makes it superior to all biometric screening technologies and methods. For these reasons, the inventor believes that all biometric screening or identification methods involving contact with the potential intruder or are only effective within an unsafe, short range suffer a fatal deficiency which are addressed by the novel aspects of the current invention. The following are examples from recent prior art within this category which demonstrates this.

U.S. Pat. No. 7,494,061, Reinhold, U.S. Pat. No. 6,871,287, Ellingson, U.S. Pat. No. 6,655,585, Shinn, U.S. Pat. No. 6,119,096, Mann et. al., U.S. Pat. No. 6,018,739, Mccoy, U.S. Pat. No. 5,229,764, Matchett et. al., and European patent application DE202005007113, Treptow Optical Sensors and Readers This category of the prior art covers all identification and screening technologies which use optical reading devices or codes. Traditional optical codes and identification technology is not suited to addressing the unique problems for friendly force identification and intruder detection because they use codes or optical signals which are visible to humans. These inventions require that a code or an optical signal be read by a person or a card reader device at close ranges. These aspects defeat the viability of the prior art in this category for two reasons. First, the codes or optical signals in the visible spectrum are more easily exploited in a tactical setting or spoofed by an intruder than optical devices operating in the non-visible range. Second, the inventions in this category usually require the unsafe distances to be effective as explained in the Biometric category above. An additional impediment to some of the prior art in this category is the need for some of these systems to combine optical identification methods with other close range methods, such as biometric screening or computer passwords. This is often required because the prior art systems can be lost or stolen and they do not include the pass code protection and timeout features of the current invention to prevent them from being exploited. For example, U.S. Pat. No. 4,837,568 by Snaper discloses a personnel identification device which can be lost or stolen and must be used with other identification means based on biometrics or computer passwords to protect against exploitation. The novel use of an optical signal in the non-visible range which is effective at safe distances or tactical ranges separates the current invention from this category of past inventions that do not solve the problem. Further, those systems described in the prior art which rely on other close-range identification methods to protect against device exploitation do not use the novel features of the current invention which defeat exploitation without using any of these other close-range methods. The inventor believes that all prior art which relies on a visible optical code or signal and those which are only effective at close distance to the prospective intruder differ substantially from the novel aspects of the current invention. The following are examples from recent prior art within this category which demonstrates this.

U.S. Pat. No. 4,837,568, Snaper, European patent application DE202005007113, Treptow Interrogating Identification and Interogation Friend or Foe (IFF) Systems Many IFF systems are described in the prior art. A key aspect of IFF is the interrogation, making the method for identification a 2-way communication. The current invention uses an active identification signal in most embodiments to provide a 1-way identification method. Furthermore, in all embodiments, the identification function is integrated with the user's uniform. All IFF systems in the prior art rely on components which are not integrated within the user's uniform, either in whole or in part. Even if the IFF equipment used for identification can be carried by an individual soldier, it is not integrated with the uniform so that it will aid in intruder detection if the uniform is lost or stolen by adversaries or insurgents. For these reasons, any prior art which relies on traditional IFF systems and technology is not prejudicial to the novelty or uniqueness of the current invention which uses a wearable identification signal that is integrated into the user's uniform and provides pass code protection, timeout and tamper-proof features to aid in intruder detection if the uniform is lost or stolen. The following prior art are examples of IFF systems which fall into this category:

U.S. Pat. Nos. 7,831,150 and 7,308,202, Roes et. al., U.S. Pat. Nos. 7,224,308 and 6,816,106, Butler, U.S. Pat. No. 5,648,862, Owen, U.S. Pat. No. 4,955,000, Nastrom, European patent WO02084324, Tatum et. al., U.S. patent application 20120189312, Maryfield et. al.

RF Identification

Many RF Identification methods are found in the prior art. Most of these are for object identification and do not describe personnel identification methods. For those that do describe personnel methods, many of these are for personnel identification or screening at close range. Passive RFID systems fall into one or both of these groups due to the distance limitations of this technology. The only RFID systems which support a stand off range similar to the current invention are active RFID systems. One embodiment of the current invention includes an active RF identification signal. However, the use of the RF identification signal in the current invention is in Passive Reader Active Tag (PRAT) or beacon mode. It uses a 1-way identification signal method like the other embodiments of the invention and it does not rely on an active reader interrogation to initiate 2-way communications. For these reasons, only the prior art which involves the PRAT systems can be similar to the current invention. However, if the PRAT systems in the prior art do not include tags which are integrated with a user's clothing, then it is unlikely to be an impediment of the current invention. Most RFID tags which are integrated structurally with the object of interest (person, animal or object) are not intended for beacon mode operation or PRAT systems. Those that are are designed for continuous broadcast of the identification signal. This is substantially different than the current invention which uses its novel features of pass code protection and time-limited operation to disable the identification function in the RF identification embodiment of the invention just like the preferred embodiments using optical signals. Unless the RFID system incorporates the same novel combination of features found in the current invention which contribute directly to friendly-force identification and intruder detection even when user clothing has been compromised, such prior art does not prejudice the novelty and uniqueness of the current invention. The following prior art are specific examples of RFID systems which have some similar features with the current invention (human wearable, but not attached, and Kotik includes tamper-proof features). However, neither of these examples include the novel combination of all of the key features of the current invention which prevent exploitation of a user's uniform (including pass code protection, timeout and 1-way signaling only in these cases):

U.S. Pat. No. 7,316,358, Kotik et. al., U.S. Pat. No. 5,973,598, Beigel

Intruder Detection Systems

Most intrusion detection systems in the prior art are based on fixed or specialized camera, imaging or other equipment used for monitoring of facilities or homes. Many involve motion detection and alarm and not authorized personnel identification. Those that involve cameras, imaging, face recognition, and similar technologies can have some application to personnel identification and screening. However, these systems differ markedly from the current invention because they do not include man-portable or even wearable components and they are not designed to operate in the field or at remote temporary security locations such as a checkpoint. The use of some of these technologies at an established access control point is similar to how the current invention supports friendly-force identification and intruder detection at a base or compound access point. However, since the prior art in this category does not include the wearable, 1-way identification devices which are part of the key features of the current invention, none are thought to address the intruder detection problem described in this invention nor present a problem to the novelty of the current invention. The following are examples from the prior art which illustrate this.

U.S. Pat. No. 8,542,109, Butler et. al., U.S. Pat. No. 8,354,928, Morcom, U.S. Pat. No. 8,258,949, Jaynes, U.S. Pat. No. 6,593,852, Gutta et. al.

Non-Identification Badging

Prior art which involves badging technology fall into two broad subcategories. Those inventions within the prior art that deal with the construction, placement or wearing of a badge but do not describe any unique identification function are not relevant to the problem described above or an obstacle to the current invention. The badging technology in the prior art which also includes identification functions are the second subcategory. Badging in this latter subcategory can include those which are only useful at close range and those which are used for identification at farther ranges. The badging requiring close range use for successful identification differs from the current invention because the current invention relies on features which make it effective at stand off ranges. But the badging which is intended for farther ranges is also not prejudicial to the current invention because these badging systems with longer range use do not include the combination of non-visible identification signals, pass code security and timeout features with a device which is integrated with the user's uniform which make the current invention uniquely suited to defeat the stolen or fake uniform threat. The following are examples of both of the subcategories within the prior art for badging technology which do not have the novel features of the current invention for the problem described above.

European patent GB1044443 (A) Atomic Energy Commission, U.S. patent application 20060087410, Garcia et. al.

Non-Individual Combat Identification

Many efforts have been made to reduce the confusion on the battlefield by creating a means to identify and distinguish friendly forces from adversaries. In recent years these technologies have become known as combat identification. The original combat identification systems were designed for vehicles or formations. The prior art in this category do not provide a means of individual identification for personnel who are not mounted in the supported vehicles. Any prior art involving combat identification which does not support individual, dismounted personnel does not relate to the current invention. The following prior art is in this category and has no bearing on the current invention.

U.S. Pat. No. 8,462,042, Delong & Blythe, U.S. Pat. No. 6,097,330, Kiser, U.S. Pat. No. 5,686,722, Dobois et al., U.S. Pat. No. 5,274,379, R. Carbonneau et al., U.S. Pat. No. 5,459,470, Wooton et al., U.S. Pat. No. 5,819,164, Sun et al., U.S. Pat. No. 4,851,849, Albersdoerfer, U.S. Pat. No. 4,694,297, Sewards Individual Soldier Combat Identification Prior art involving combat identification for the individual soldier is related to the current invention. Most of the prior art involves attempts to move the traditional combat identification systems from vehicles and integrate them with the foot soldier. For this reason, most in this category are similar to the IFF systems and involve some form of RF or IR interrogation. Some also involve the reduction of communications equipment to be portable. However, for the reasons that the 2-way IFF systems are not similar to the novel features of the current invention, the prior art in this category is not similar to the current invention. Combat identification systems which are not integrated with the soldier's clothing and which are still mounted on equipment, even if handheld, do not incorporate the novel integration of the identification signal with the uniform as in the current invention. Also, the interrogating 2-way methods used in the prior art is not similar to the current invention because all but one embodiment of the current invention relies on 1-way identification signals to more effectively defeat the intruder threat. As in the case of the prior art for IFF systems, unless a combat identification system from the prior art includes the novel features of the current invention including a wearable identification signal that is integrated into the user's uniform, use of 1-way signaling in most embodiments and pass code, timeout and tamper-proof security features in all embodiments to prevent compromise, the prior art cannot apply to the current invention. The following prior art in this category are combat identification systems which may have some similar features, but do not have the combination of features which makes the current invention novel for addressing the intruder detection problem.

U.S. Pat. No. 8,184,981 Ivtsenkov et. al., U.S. Pat. Nos. 8,115,697 and 7,196,655, Hayles & Omara, U.S. Pat. No. 5,966,226, Gerber, European patent WO0133748, Radomsky, U.S. patent 20090045996, Ivtsenko Each of these examples in the prior art clearly suffer from one or both of the problems explained above for most of the prior art in this category. In addition to these more easily disposed cases in the prior art, there are a few combat identification systems which are worth further discussion to make it more clear how these significantly differ from the novel features of the current invention. Each of the following combat identification systems from the prior art include one or two features which are similar to the current invention. However, the following discussion will show that each one of these inventions is still lacking in its ability to effectively address the threat of intruder exploitation of stolen or fake uniforms because none of them contain all of the key features which are required to defeat this threat. How the current invention does this compared to each of these systems is explained in the following.

U.S. Pat. No. 7,983,565, Varshneya, discloses laser ranging and 2-way optical communications based on lasers for combat identification and other operation. The 2-way optical communications method used in Varshneya is not similar to the 1-way identification method used in most embodiments of the current invention nor is it comparable in its effects to the non-visible signaling method defined in the preferred embodiment of the current invention. Varshneya describes a retro-reflective method for use with his laser device which is similar to one embodiment of the current invention that uses retro-reflective or other reflective surfaces for 2-way optical identification signals. Varshneya includes this method in the description of the invention but not in the claims. He also includes a general reference to password protection of some of the equipment used in his system in the description of the invention but not in its claims. The reflective methods and the password protection are the only similarities to the current invention. However, Varshneya's invention does not cover the novel combination of all features used by the current invention for identification and intruder detection. Specifically, Varshneya's system is based on equipment which is mounted or integrated with combat equipment. It is not a wearable system which is integrated into the user's clothing like the current invention. Varshneya does not contemplate nor disclose a time limit for the password protection which he discusses briefly. By not integrating his system components in the uniform and by not describing specific steps for tamper proofing like in the current invention, Varshneya's inventions suffers from the common problem of pilfering, tampering and exploitation which all portable equipment-based systems suffer. Additionally, Varshneya's intended use for the invention is substantially different than the current invention. In Varshneya, the invention uses a 2-way exchange of a code of the day word using his laser-based communications. This is much more of a complex identification function than the current invention which relies on observation of a 1-way non-visible or visible identification signal. The complexity in Varshneya's intended use compared to the applications of the current invention shows that the current invention is much more likely to be useful to a less technologically-advanced security force where cost, availability of equipment and training are factors. For these reasons, it is believed that prior art in Varshneya does not disclose the same type of novel combination of key features of the current invention including the integration of an identification signal with a user's clothing, pass code protection, time-limits, and tamper-proof identification signals which is uniquely suited for dealing with the threat of stolen or fake uniforms in tactical and security scenarios. Further, the 2-way complex communication described in Varshneya is substantially different than the 1-way methods for identification used in all but one embodiment of the current invention. Yet even in the single embodiment of the current invention which uses 2-way identification based on reflective surfaces, the current invention uses a novel combination of features for an identification and intruder detection system which Varshneya's use of reflective surfaces does not contemplate. The novel use of a pass code protected, time-limited, tamper-proof identification signal even for the embodiment of the current invention which uses reflective surfaces is not found in Varshneya's prior art nor an obvious extension of his system.

U.S. Pat. No. 6,701,649, Brosi, also involves combat identification based on reflective IR signaling. Brosi claims attachment of his invention to head gear or a uniform, which is similar to the use of an identification signal which is integrated with the user's uniform in the current invention. Like Varshneya, the reflective surface of Brosi is only similar to the single embodiment of the current invention which relies on reflective surfaces. As with Varshneya's reflective surface, the use of a reflective surface alone with identification systems does not make it similar to the current invention. Brosi does not include the novel combination of features of the current invention in his prior art. Even though it is based on a signal which attaches to the uniform, the identification signal is not pass code protected, is not time-limited and not tamper-proof like the current invention. All other embodiments of the current invention also do not rely on a reflective surface for identification as in Brosi. For these reasons, Brosi's prior art does not cover the novel combination of features and invention of the current invention which are uniquely suited to identification and intruder detection.

U.S. Pat. No. 5,414,405, Hoggs is similar to Brosi in that it provides a means of attaching a personnel identification device to a user's uniform. Hoggs uses non-visible light for his identification system in place of the reflective surface in Brosi. The non-visible identification signal in Hoggs is similar to the use of non-visible identification signals in most of the embodiments of the current invention. However like Brosi, Hoggs does not cover the novel combination of features which the current invention uses for identification and intruder detection. The current invention provides a non-visible identification signal which is wearable and integrated with the user's uniform, but this system is also password-protected, time-limited and tamper-proofed. This novel combination of features in the current invention are not covered by Hoggs and are not obvious extensions of his prior art.

U.S. Pat. No. 5,299,227, Rose, discloses a 1-way signaling system based on non-visible signals for identification of individual combatants. This is similar to the 1-way, non-visible signaling used by the current invention. Like Varshneya however, Rose relies on attaching the identification signal to equipment or outer vests rather than integrating the system as part of the clothing. This presents the same problems as other similar inventions: it is removable and can be pilfered, suffer tampering, or replaced and exploited. There is no password protection or timeout of the identification signal in Rose's prior art. It is also the case that the invention of Rose is designed not to work with existing non-visible viewing systems such as night vision. This means that Rose is lacking the critical need to be able to be used without costly or special extra reading equipment. For these reasons, the prior art in Rose does not compare to the novel combination of features in the current invention including the integration of an identification signal with a user's uniform, pass code protection, time-limited operation, and tamper-proofing and alerts and it is not effective for use by security forces which do not have specialized or costly viewing equipment.

As can be seen by the preceding exhaustive review of the prior art and the background of the current invention, no identification system in the prior art or found elsewhere is known today which provides a novel combination of all of the following key features that are needed to effectively address the need for identification and detection of intruders who are wearing stolen or fake uniforms. It is the intention of the current invention to provide a novel combination of all of these features and provide an effective solution which meets this need.

wearable
    identity integrated with official uniform
    pass code protected operation
    automatic timeout after pass code expires
    tamper proof and not pilferable/removable
    provides alert signal if tampering or failure is detected
    uses non-visible signaling
    works at stand off and tactical ranges
    optionally extremely low cost
    optionally works with current equipment and training
    optionally change mode between non-visible signaling methods and frequencies

BRIEF SUMMARY OF THE INVENTION

A wearable, non-visible identification device that provides reliable, tamper proof, friendly-force identification and intruder detection. The device includes a user input device or surface for daily entry of a unit- or user-defined pass code. This can be a keypad, touchpad, or other user input device. A timeout capability allows the device to disable the identification signal if the pass code is not entered within the specified time period. For example, the device can be designed to require pass code entry every day and disable the identification function if the pass code is not re-entered within 24 hours. The device is integrated with the user's uniform and provides a non-visible identification signal from one or more locations on the uniform. This invention can support one or more locations on a garment or uniform and the intention of this invention is to cover any location and configuration of identification signals on a user's uniform within the scope of the invention and be protected by the accompanying claims. The identification signal is based on a 1-way, non-visible signal which supports identification at safe or tactical distances. The device can be programmed to support user configuration of various operating parameters including intensity, blinking mode, pattern, duty cycle, non-visible frequency, reflective mode, power mode, security mode, pass code, timeout function, and other operating parameters or these parameters can be programmed as fixed values.

When integrated with the uniform, the device provides a pass code protected, time limited identification function with other protections against tampering. These features of the invention prevent the use of the uniform by unauthorized personnel. If a uniform with the device is lost in the laundry or while it is being transported separately from the user, an unauthorized user or intruder who is wearing the uniform after the timeout has disabled the identification function will not be able to identify themselves as a member of the unit or organization represented by that uniform. If the unit or organization using that uniform incorporates proper identification procedures into its security operations, an intruder will not be able to approach the other unit or organization members without prompt detection. This invention provides the capability for friendly-force identification or intruder detection at a safe distance or tactical range which is only limited by the effective range of the identification signal. For the non-visible optical identification, an intruder can be detected within line-of-sight distance, well before the distance required to read a security badge or perform other normal forms of personnel screening. This safe distance will dramatically reduce the ability of covert intruders in misappropriated uniforms from causing casualties at close range.

In addition to the pass code protection, other security features of the invention will prevent the use of the device by unauthorized personnel when tampering is detected. The tamper-proof features of the invention include electrically-sensitive threads which are integrated within the device's stitching with the uniform, in such a way so that the device will not perform its identification function if it is removed from the garment or these threads are cut. Also, tampering can be detected if unexpected changes to the power source or its connections occur. If connections to the identification signal components of the device are broken, the processor component will disable the identification function until the user pass code is authenticated. This protection can be designed to disable only a single identification signal or to disable all identification signals if tampering is detected. If the device loses power or the connection to the power source is broken, the processor component will disable the identification function until power is restored and the user pass code is authenticated. The device can be designed to provide a default non-visible or visible alert signal at the factory to identify tampering during initial shipping or following the loss of power, loss of a connection to an identification signal, or when other failures or tampering is detected in the field. The processor component can also be designed to disable the identification function or display an alert signal when processor changes or errors are encountered, such as software exceptions, malicious software, firmware changes or other similar indications of tampering or unauthorized processor changes. A variety of these tamper-proof security features or combinations of them can be included in the design of the current invention. The intent of this invention is to cover the tamper-proof features described here including a) electrically-sensitive threads or other types of garment construction which supports the detection of tampering with the identification signal component or its location; b) processor or other device functions which disable the device following loss of connection with the identification signals or with the power source; c) processor functions which detect changes to the processor on power-up or during operation indicating tampering or unauthorized software or firmware changes; and d) use of a visible default alert signal when the device is first shipped and has not been configured or initialized by the user or when tampering or faults are detected. The invention is intended to cover any other tamper-proof features of the invention which are similar to features a) to d) listed above, but include obvious or apparent changes, improvements or differences to someone skilled in the art and that all such tamper-proof features or changes or improvements to these tamper-proof features are intended to be within the scope of this invention and protected by the accompanying claims.

An alternative embodiment for this invention uses a removable and attachable identification signal component or entire device which can be removed by the user from one uniform and attached to another uniform or another location on the same uniform. This embodiment supports the re-use of devices or the use of different uniforms for different missions or geographic location. In this embodiment, the tamper-proof protections are modified to allow removal and re-attachment by an authorized user but maintains tamper-proofing features which prevent unauthorized tampering. For example, the permanent device embodiment tamper-proofing may include disabling of the device permanently when the device is removed. For the removable embodiment, the device can include a temporary disabling of the device upon removal but allow the device to be enabled again when the pass code is entered on the new uniform by an authorized user. A variety of means for removing and re-attaching the device or its indication component can be designed as part of this embodiment and a variety of tamper-proof modifications can be made for this embodiment. The intention of this invention is to cover any and all means for removing and attaching of the device or its indication component and any and all means of tamper-proof modifications or configurations are covered within the scope of the invention and are protected by the accompanying claims.

Another embodiment of the invention uses visible light identification signals for friendly-force identification or intruder detection. The device can be designed using visible light identification only or in conjunction with the other forms of identification signaling from the other embodiments. A variety of designs for the visible light indication can be part of this embodiment including different numbers, frequencies, brightness, blinking behavior, pattern, modulation control, or other characteristics. The intention of this invention is that any and all visible light identification are covered within the scope of the invention and are protected by the accompanying claims.

An alternative embodiment of the invention uses an alert signal after the processor timeout occurs or tampering is detected. This embodiment uses an alert signal displayed on one or more identification signal components in place of disabling the identification function. When considering this embodiment, all references in the description of the invention which refer to the disabling of the identification function should be interpreted to mean the use of the alert signal in place of disabling the identification function. The device can be designed to use non-visible or visible signals for the alert signal. When non-visible signals are used for both identification signals during normal operation and the alert signal, the alert signal will have markedly different characteristics including frequency, intensity, pattern, modulation or other characteristics so that it will be obvious that an alert for an unauthorized use of the device is being displayed. The same requirement will apply with visible identification signals are used with visible alert signals. A variety of means for displaying an alert signal following timeout or tampering can be used with this invention. The intention of this invention is that any and all such alert signal methods are covered within the scope of the invention and are protected by the accompanying claims.

One embodiment of this invention uses ultraviolet (UV) light as the non-visible identification source. The UV identification can be designed as the only non-visible identification or in conjunction with other non-visible or visible identification signals. This embodiment includes means of controlling or limiting the transmission of the UV identification in order to protect observers from harm. A variety of means can be used to control or limit the UV light signal including controlling the duration, intensity, frequency, blinking mode, pattern, modulation, or other characteristics. The device can be designed to allow the use of the UV identification mode when manually switched on and switched off normally in order to limit the possibility of the use of this identification mode when conditions are not right, when it is desired to use this mode, or only when the observers have UV-capable reading devices or cameras. The intention of this invention is that any and all UV light identification are covered within the scope of the invention and are protected by the accompanying claims.

An alternative embodiment for the invention includes the use of a Radio Frequency Identification (RFID) in place of the non-visible optical signals or in combination with them. The RFID mode can be programmed to be user configurable or fixed at the factory. In RFID mode, the device will transmit an identification signal periodically as an Active RFID tag. This embodiment of the invention can support a variety of RFID protocols and modulation modes and the intention of this invention is that any and all RFID configurations and behaviors are covered within the scope of the invention and are protected by the accompanying claims.

One embodiment of the invention is for the device to include a programmable microprocessor to perform the functions of processing user input through the user interface, configuring the operating parameters and modes at the factory and in the field, changing and processing pass codes, providing device timer functions and performing timeouts, detecting tampering and performing alerts, performing device administration and power management functions, interfacing with external devices, and other microprocessor or device functions.

An alternative embodiment is for the device to include Programmable Logic Device (PLD), Field Programmable Gated Array (FPGA) or non-programmable Application Specific Integrated Circuit (ASIC) processor to perform the functions of processing user input through the user interface, configuring the operating parameters and modes at the factory and in the field, changing and processing pass codes, detecting tampering and performing alerts, providing device timer functions and performing timeouts, performing device administration and power management functions, interfacing with external devices, and other device functions.

Another embodiment for extremely small or extremely low power applications uses a Micro-Electromechanical System perform the functions of responding to user input through the user interface, processing pass codes, detecting tampering and performing alerts, providing device timer functions and performing timeouts, and other limited device functions.

An alternative embodiment of the invention supports an extremely low-powered implementation with a small battery or for operation using non-battery sources of power including body- or motion-generated power, intermittent solar power, and/or ambient and directed RF power. The device can be designed to work with these non-battery sources only or in conjunction with a small battery and these other sources. This low power embodiment will also support the use of conformal user inputs around the periphery of the device in place of a keypad. A variety of battery sizes and non-battery power sources can be used with this and other embodiments of the invention. It is the intention of the invention that all battery sizes and non-battery power sources which are obvious or apparent to a person of normal skill in the art are covered within the scope of the invention and are protected by the accompanying claims.

Another embodiment includes the use of a reflective or retroreflective surface to provide the non-visible or visible light identification signal. This embodiment implements a 2-way identification method for friendly-force identification or intruder detection. It can support the use of normally available light sources in the field to illuminate the prospective intruder, using the reflection of the reflector as the identification signal. This embodiment includes the pass code protected timeout of the identification signal by incorporating an electronically switched surface of different transparencies over the reflective element which turns completely opaque when the device is disabled by the timeout. The device can be designed to work with this reflective, low power identification signal only or in conjunction with an active light source for the identification signal. This embodiment of the invention can support a variety of reflective or retroreflective surface types and materials and a variety of switchable surfaces for implementing the identification timeout. The intention of this invention is that any and all reflective or retroreflective types and materials and any and all switchable surfaces are covered within the scope of the invention and are protected by the accompanying claims. This embodiment supports the low power embodiment by providing an identification signal which requires no power or extremely small amounts.

An alternative embodiment of the invention includes a digital or other interface to an external wearable combat system or power source. For example, the U.S. Army Future Combat System and Land Warrior programs have developed a computer subsystem for the individual soldier's combat system. The U.S. Air Force is evaluating modular tactical systems for forward air controllers. This embodiment will support digital interfaces to such man-portable, microprocessors, computer or other subsystems of advanced individual combat equipment. It will also support an optional connection to an external power source which will be used to power the device in place of the battery or non-battery sources described in the other embodiments. Under this embodiment, the invention will be able to receive control and configuration signals from the user's other systems. Any external keypad or keyboard system will be able to send pass codes to the invention through the digital or other external interface included in this embodiment. This embodiment of the invention can support a variety of external interfaces to other man-portable computers or other subsystems which are part of an individual combat system and the intention of this invention is that any and all digital or other external interfaces are covered within the scope of the invention and are protected by the accompanying claims.

All embodiments of the current invention rely on identification signals made of non-visible or visible signals. Each of these embodiments can be designed with a variety of signaling methods including different durations, frequencies, patterns, intensities, modulation, blinking or other characteristics or behaviors or combinations of any of these. The intention of this invention is that any and all signaling methods using the non-visible and visible identification signals included in the embodiments of the invention are covered within the scope of the invention and are protected by the accompanying claims.

All embodiments of the current invention include a user pass code input to disable the device after timeout. The references to a pass code in all of these embodiments is intended to cover any type of code, sequence, phrase or other input entered by the user for time-limited activation of the identification function. The intention of this invention is that any and all user inputs that can be used in the embodiments of the invention for this purpose are covered within the scope of the invention and are protected by the accompanying claims.

All embodiments include a variety of numbers and configurations of identification signals located on various garments or equipment worn by users, such as shirts, blouses, hats, headgear, jackets, parkas, utility uniforms and coveralls, vests, outer vests, packs, individual weapon systems, individual communication gear and electronics, pants or other garments which will allow detection of the signal for friendly-force identification and intruder detection. The most common location for non-visible light identification signals will allow the identification signal to be seen by the light sensing equipment at a safe distance. The identification signal under the embodiment which uses RFID identification signals can be located in similar locations or can be located in other locations which are not exposed. Locations for the embodiment of the invention using RFID identification signals must be chosen to prevent clothing or individual equipment from obstructing the RF signal, but more flexibility is possible for location of the identification signal under this embodiment. For all embodiments, the type of garment has to be large enough to contain the minimum components of the invention including at least one identification signal and the processor as described above or to support connections between these components placed on other user garments. All such placement of the identification signal, including the number, location, configuration, types of garment, and other placement characteristics for the device and its components is intended to be covered within the scope of this invention and to be protected by its claims.

Other systems, methods, configurations, features, uses and advantages of the invention will be apparent to one with skill in the art after examination of the information disclosed in this invention and the figures, detailed description and claims. The intention of this invention is that all such additional systems, methods, configurations, features, uses and advantages are within the scope and description of the current invention and are protected by its accompanying claims.

BRIEF DESCRIPTION OF THE SEVERAL
VIEWS OF THE DRAWING

The description of the current invention relies on the following drawings. These drawings are not to scale and contain only enough detail for descriptive purposes and are intended to aid in understanding of the invention and the concepts and methods for its use with the accompanying specification and claims.

DETAILED DESCRIPTION OF THE
INVENTION

As used in this specification, there term "wearable" refers to an item which is permanently integrated with and part of a uniform or other clothing such that alteration or modification is required to remove the item. The terms "wearing" or "worn" refer to the wearing of wearable items which have this meaning. An exception is when the terms "attachable", "re-attachable", "attached", "attachment", "attach", or "removable" are used when describing a wearable item. In this case, it will be understood that the item is not permanently integrated with the clothing but uses some means of temporarily wearing the item with the clothing or to affix the item to non-clothing items. In all other cases, the first meaning defined for the use of "wearable" as a permanently integrated item is intended. The term "processor" refers to a logic circuit or logic processing device such as a microprocessor, PLD, FPGA, MEMS, or control circuit which is used in any of the embodiments to process user input, control the identification signal, manage the device power or configuration and interface with external interfaces. The "identification signal" refers to the non-visible or visible identification signal which is used in any of the embodiments, including IR, visible, UV lights, RFID tag and beacon, reflective or retro-reflective surfaces, or any other identification signaling method or device used in the embodiments. The term "pass code" refers to any user input code, sequence, word or other input which is used to authenticate the user as an authorized user. The term "power source" refers to the means which is used in any of the embodiments for providing power to the invention, including battery, solar power, body-heat or -motion generated power, external interface power or any other power sources used in the embodiments. The term "input device" refers to any user input interface which is used in the embodiments, including keypad, touchpad, conformal user input, or any other input device used in the embodiments. The term "safe distance" or the use of the term "safe" when referring to identification methods and distances means a sufficient distance between an observer and an unidentified personel so that a potential threat carried by the unidentified personnel will have a low probability of causing serious harm to the observer. This distance depends on the type of threat and the circumstances. For example, it will be understood to be farther for security operations at a checkpoint screening vehicles than it will be closer at an access point which is screening dismounted individuals. For the purposes of this invention, a "safe" distance is intended to mean a distance at least greater than the effective arms-reach distance of an average person, which is generally greater than ½ meter.

Figure 1:
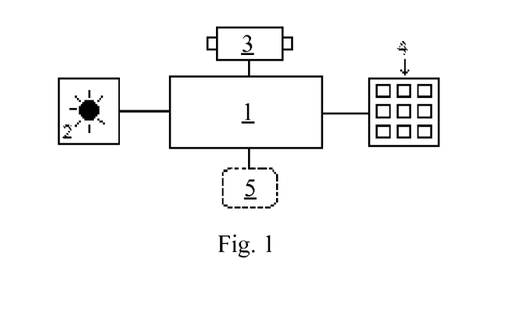
FIG. 1 is a system block diagram showing the components used in different embodiments of the invention.

The invention consists of the components shown in FIG. 1. 1 is the processor which processes user pass code and other inputs and disables the identification function after a processor managed timeout. The identification signal component 2 is enabled and disabled by the processor 1. One or more identification signals 2 can be included in the design of the invention. The processor 1 and identification signals 2 are connected through a direct electrical connection or through an electronic circuit. The processor 1 provides a timer function which is used to disable the identification signal 2 if the timeout setting of the processor has been exceeded since the user's last pass code input. The processor 1 controls the configuration of the device and monitors the inputs from the tamper-proof features of the device. This information is used by the processor 1 to enable the identification signal 2 after normal start-up and initialization. The processor 1 processes the changes in tamper-proof inputs and will disable the identification signal 2 if the tampering is indicated.

The processor 1 manages the device power, which is provided by the power source 3. The power circuits on the processor 1 provide regulation, conversion and distribution of power to all other components of the device, including the identification signal 2 and input device 4. The user input 4 which provides a method for entry of the user's pass code is connected to the processor 1. The processor 1 provides an external interface 5 for digital communication or power connections to an external individual combat system.

Figure 2A:
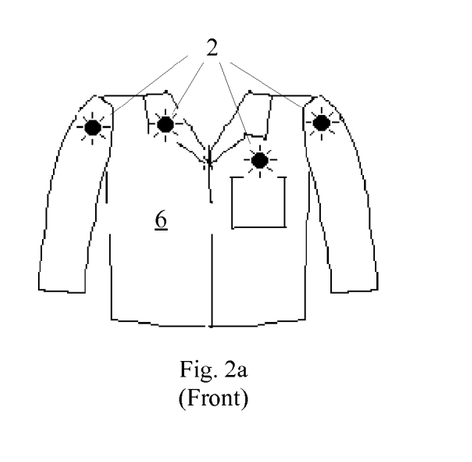
FIG. 2*a* shows the front of a typical user garment and example locations for the identification signals used by the system.
Figure 2B:
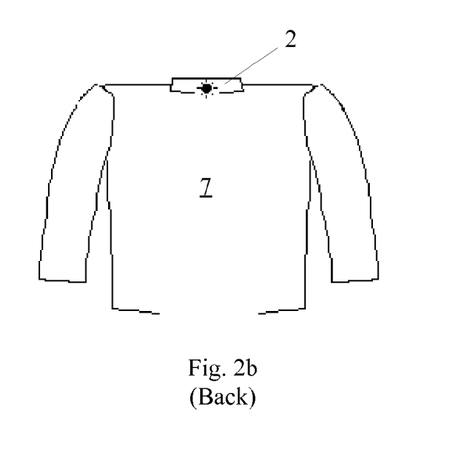
FIG. 2*b* shows the back of a typical user garment and an example of a preferred location for the identification signals used by the system.

FIGS. 2a and 2b illustrate an example of how the identification signal components of the invention can be placed on a garment for friendly-force identification and intruder detection. The locations shown in these figures are for illustration purposes only. Other locations, numbers and configurations of the identification signals can be made after determining the most effective location for garment type, uniform style and for wearing with other combat or security force gear, such as interceptor body armor vests. Multiple locations in a single user's clothing will be more effective against a single identification signal from being damaged during operations. The intent of this invention is to cover any and all locations, numbers and configurations of the identification signal components of the invention on the user's clothing, including the use of identification signals on any and all other types of garments or equipment such as hats, headgear, jackets, parkas, utility uniforms and coveralls, vests, outer vests, packs, individual weapon systems, individual communication gear and electronics, pants, or other locations. The type of garment has to be large enough to contain the minimum components of the invention including at least one identification signal and the processor as described above or to support connections between these components placed on other user garments. FIG. 2a shows multiple possible locations for the identification signal 2 on the front of a garment 6. The use of FIG. 2b shows how the identification signal 2 can be placed on the back of the garment 7 in a location which will still be plainly visible and effective for all embodiments of the invention, even when individual equipment is carried on the user's back.

Figure 3:
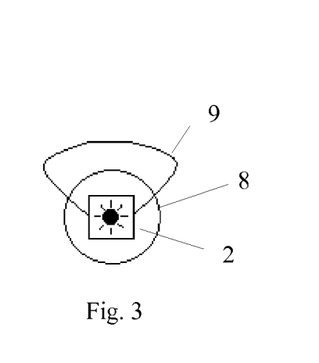
FIG. 3 is an example of a tamper proof feature of the invention.
Figure 4:
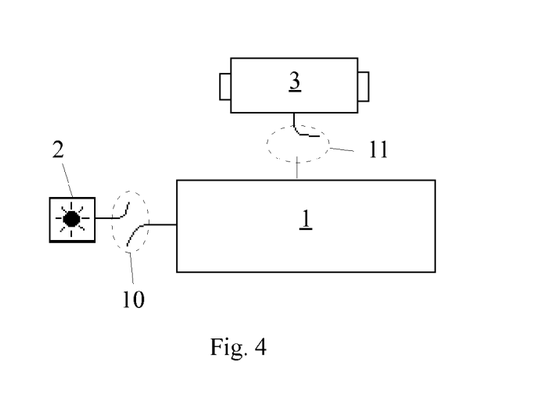
FIG. 4 is an example of how loss of signal connection and loss of power connection can be used as a tamper proof feature of the invention.

FIGS. 3 and 4 show some of the tamper-proof features of the invention. These figures are for illustration only and do not represent all of the possible means for preventing tampering with the device. Any different implementation, application or improvement upon the examples shown in these figures which are obvious or apparent to a person skilled in the art are intended to be covered by this invention and protected by its claims. FIG. 3 shows an example of how an electrically sensitive thread can be used in the construction and attachment of the identification signal component of the invention. In the example of FIG. 3, the identification signal 2 is located within a radius of the garment 8. An electrically-sensitive thread 9 which traverses the radius of the garment 8 is used to detect when the identification signal 2 is removed or cut out of the garment. If an unauthorized user re-locates, alters, or removes the identification signal 2 from the radius of the garment 8 in such a way that the electrically-sensitive thread 9 is broken, the device is designed to interrupt the electrical signal to the identification signal 2 and prevent the unauthorized user to use the device as an intruder without detection.

FIG. 4 is another example of the tamper-proof features of the invention, showing how the loss of connections or power to the processor component of the invention can be used to detect tampering. In FIG. 4, the identification signal 2 is normally connected to the processor 1. 10 represents a loss of signal connection between the processor 1 and identification signal 2. If the processor 1 detects a loss of signal connection 10 to one or more identification signal 2 components, the device can be designed to disable the identification function. This feature can be designed to disable a single identification signal 2 or all identification signal 2 components on the garment. The tamper-proof feature based on a broken electrically-sensitive thread as shown in FIG. 3 can be combined with the loss of connection to the identification signal 2 shown in FIG. 4 to disable the device's identification function if the loss of connection is due to tampering which includes re-locating, altering or removing an individual identification signal 2. FIG. 4 also shows how a loss of connection between the processor 1 and the power source 3 can be used to prevent tampering. 11 represents a loss of power connection to the processor 1 which can occur if the power source 3 is removed or the connection to the power source 3 is broken during tampering by unauthorized personnel. If the processor 1 loses power due to a loss of power connection 11, the processor can be designed to disable the identification function prior to shutdown and to prevent the identification function from being enabled on the next power-up until after the user pass code is authenticated. The processor 1 can also be designed to provide a visible alert signal when tampering is detected from a loss of power connection 11 or a loss of signal connection 10. After a loss of signal connection 10 is detected, the processor 1 can display a visible alert signal using any remaining identification signal 2 components which are still connected. After a loss of power connection 11, the processor 1 can be designed to provide a visible alert signal on the next power-up until the user pass code is authenticated. The processor 1 design can include a visible alert signal by default when the device and its garment is first shipped from the factory to the field in order to provide protection from tampering if the garment is lost or stolen during shipment. This description is not intended to include all possible examples of the tamper-proof features of the invention and any other methods, configurations, or features of the invention that can prevent or discourage tampering which are obvious or apparent to a person skilled in the art are intended to be covered by this invention and protected by its claims.

Figure 5:
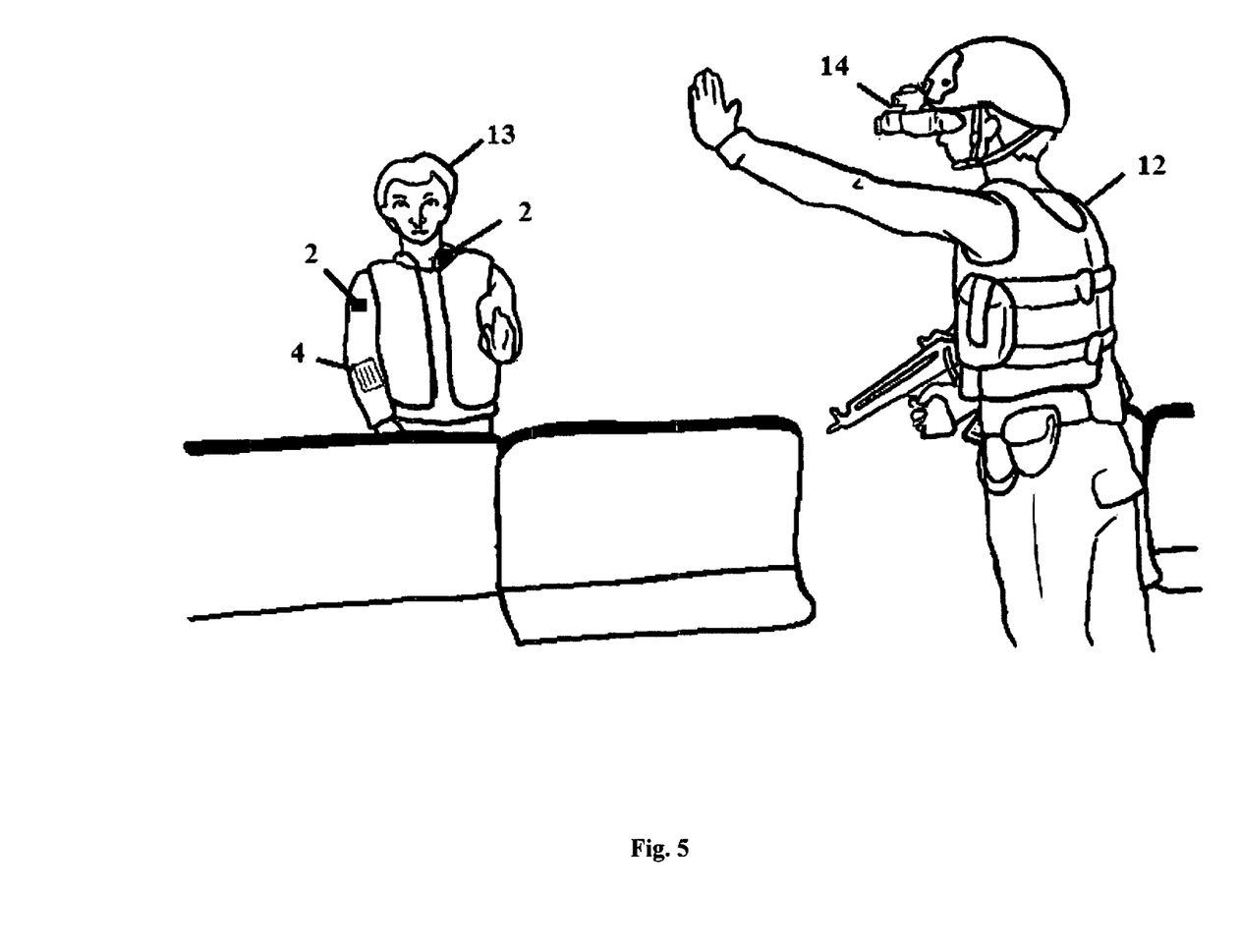
FIG. 5 is representative scenario how an embodiment of the invention is used for identification and intruder detection at an access point or security checkpoint.
Figure 6:
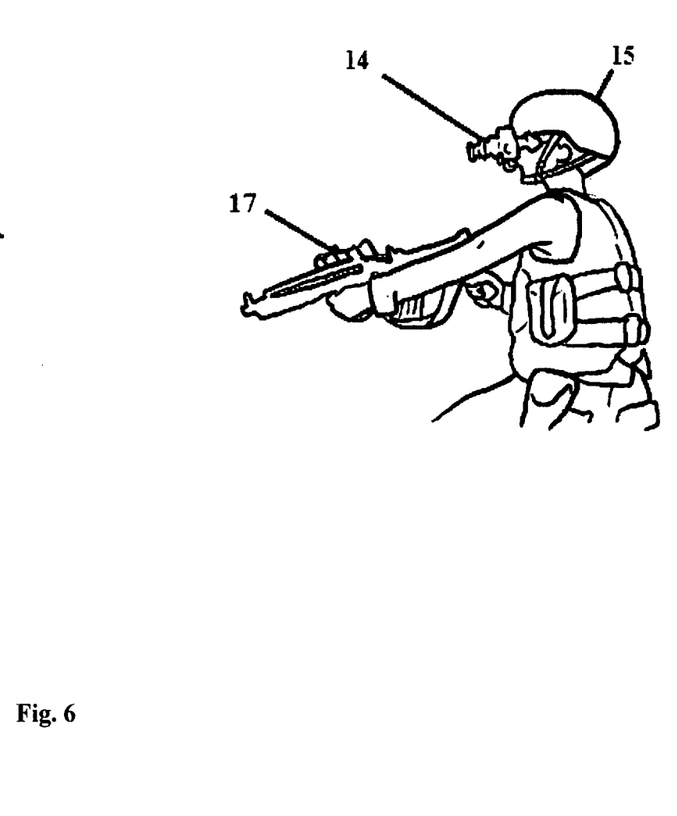
FIG. 6 is a representative scenario for use of the various embodiments of the invention in the field during tactical operations.

FIGS. 5 and 6 show example use cases for the invention. In FIG. 5, the use of the invention to identify personnel at a security checkpoint. The scenario represented in FIG. 5 includes a sentry 12 at the checkpoint who is observing unidentified personnel 13 as they approach the guard post. The unidentified personnel 13 is wearing an identification signal 2, which is disabled in this scenario. The sentry 12 is following standard operating procedures for the theater of operations, which calls for the use of infrared viewing equipment 14, which is standard equipment for the theater of operations, for identifying friendly-forces and detecting intruders. This can include existing night vision equipment during low light conditions or with daylight filters or a security force can use existing thermal imaging equipment for all times of day. A variety of non-visible signal viewing equipment can be used with the invention depending on the frequency and characteristics of the indication signal 2 used and the intent of the invention is to cover any and all scenarios where a sentry 12 uses such viewing equipment to read the identification signal 2. During this scenario, the sentry 12 will not positively identify the unidentified personnel 13 because his identification signal 2 is not displaying a friendly-force identification signal which is visible in the infrared viewing equipment 14 of the sentry 12. Prior to the unidentified personnel 13 reaching within the safe distance of the checkpoint, the sentry 12 uses applicable rules of engagement to challenge the unidentified personnel 13, interdict him from approaching any closer and request proper identification while still at a safe distance. At this point, a user who is not an unauthorized intruder can re-enter his pass code using the user input device 4, which re-enables the identification function within the device and a non-visible identification signal 2 is displayed. In this case, the sentry 12 is able to see the identification signal 2 using his infrared viewing equipment 14 and the sentry 12 allows the unidentified personnel 13, who has now been identified as friendly, to pass the checkpoint. If the unidentified personnel 13 was not able to enter the pass code or enable identification signal 2 after being challenged in this scenario, the sentry 12 would be able to stop the unidentified personnel 13 and work with local security forces to eliminate the threat posed by him before the unidentified personnel 13 could approach to within a safe distance and cause harm to the sentry 12 or others.

This scenario demonstrates the preferred use of the invention when used to identify friendly-forces and detect intruders at a controlled access point or security checkpoint. Unlike badging, biometric and other identification systems and methods from the prior art which require contact with the unidentified personnel 13 or close proximity to him, this scenario demonstrates how the current invention provides a stand-off method for identification of an unidentified personnel 13 at a safe distance. Another novel feature of the current invention which is also demonstrated in this scenario is the use of a non-visible identification signal 2. The embodiment of the invention which uses an infrared non-visible identification signal 2 reduces cost for the security forces using it because this identification method can be used with standard tactical infrared viewing systems available to many security forces. By using an existing tactical viewing system, the embodiment described in this scenario relies on a method which uses a 1-way identification signal. No additional equipment is needed by the checkpoint personnel to interrogate the identification signal 2 of the current invention under this embodiment. Not only is the non-visible identification signal 2 of the invention and the use of a 1-way identification signal 2 a practical and cost saving means of identification, but it is also novel to use non-visible signals integrated within user clothing for intruder detection for several reasons. Unlike all visible identification systems and methods in the prior art, the use of non-visible identification signals 2 by the current invention provides a means of detecting intruders which is not immediately visible or apparent to the intruder. Badges, cards, biometrics and other identification systems based on visible means provide key information to the intruder prior to their attempt to access a secure compound or facility. This prior knowledge which is obvious to the naked eye gives the intruder the opportunity to correct or forge the visible identification means in order to circumvent the security procedures of the opposing force. By relying on a non-visible identification signal 2, the embodiment shown in the scenario above can detect and interdict the intruder when the intruder himself does not even know that his identification is failing to pass. Other non-visible identification systems in the prior art share this feature of the current invention. However, the integration of the non-visible identification signal within the user's clothing is a novel way to prevent misappropriated or fake uniforms from allowing intruders to defeat security checkpoint procedures. A further novel innovation of the current invention shown in this scenario is the use of a pass code protected timeout with the identification signal 2 that is integrated in the uniform. The timeout is a critical novel feature for use with stolen or lost uniforms. Additionally, the pass code capability which allows an unidentified personnel 13 to respond to a challenge by re-enabling the identification signal 2 if it has failed is another key and novel aspect of the current invention. The combination of the non-visible identification signal 2 integrated with the uniform, with a pass code protected timeout is the most novel aspect of the current invention and this makes the combination of features provided in the current invention to be the only effective solution for intruder detection involving stolen or fake uniforms known today. An increase in the number of apparent green-on-blue attacks on security forces which are suspected to have been caused by adversaries or insurgents who are using stolen or fake uniforms has been seen in recent years. The above scenario demonstrates how the current invention provides a novel combination of means of new and other technology which is not obvious in order to directly and effectively eliminate such a threat. The fact that other visible and non-visible technologies in the prior art which are available to security forces today have not provided an obvious and effective solution to this problem which is increasing in war-torn areas makes the case that the novel solution as disclosed in the current invention is needed. If the novel combination of the features used in the current invention were obvious to persons skilled in the art, then security forces somewhere in the world would not be hesitating to implement them in order to deal with this pressing problem and to save lives.

The example scenario of FIG. 5 can also be used to describe a scenario where a sentry 12 uses an alternate embodiment of the invention to confirm the identity of the unidentified personnel 13. For example, if the invention which uses ultraviolet light for the non-visible identification signal 2 is used, the same identification scenario would be possible if the sentry 12 uses an ultraviolet camera in place of the infrared viewing equipment 14. The use of this alternate embodiment of the invention would be almost identical to the scenario described above for the security checkpoint portrayed in FIG. 5 and the effective identification of an authorized user or an unauthorized person at a safe distance would be possible through the use of the invention. Additionally, the key aspects of the invention which distinguish it from the prior art as a novel and non-obvious invention and make it an attractive solution for the pressing security problems of today as described above for the example scenario of FIG. 5 apply to this alternate embodiment of the invention which is based on a non-visible ultraviolet identification signal 2.

FIG. 6 shows an example of another use for the invention. In FIG. 6, use of the invention for friendly-force identification while operating in the field is demonstrated. In this scenario, a soldier 15 is approaching an unidentified combatant 16 during a tactical operation. The soldier 15 uses his infrared viewing equipment 14, which is standard combat equipment for the theater of operations, to view if the unidentified combatant is displaying an identification signal 2. This can be standard night vision equipment during low light operations, modified night vision equipment for daytime operation, or standard thermal imaging equipment for all times of the day. If the soldier 15 is able to see the identification signal 2 operating normally using his infrared viewing equipment 14, the soldier 15 can use this information with other tactical information to classify the unidentified combatant 16 according to the rules of engagement. Alternatively, if the soldier 15 cannot observe the identification signal 2, the soldier 15 can use this information with other tactical information and use the rules of engagement to either challenge the unidentified combatant 16 or work with known friendly forces to neutralize the threat posed by the unidentified combatant 16. In this scenario, the combat team is using the embodiment of the invention which uses an identification signal 2 combining an infrared signaling component with a reflective signaling component. In this case, the soldier 15 can use the laser range finder equipment 17 which is standard combat equipment carried by his team to shine on the identification signal 2 on the unidentified combatant 16. If the soldier 15 sees the identification signal 2 while shining his laser range finder equipment 17 on unidentified combatant 16, he can use this information with other tactical information to classify the unidentified combatant 16 according to the rules of engagement. If the soldier 15 cannot observe the identification signal 2 after shining the identification signal 2 with his laser range finding equipment 17, the soldier 16 can use this information with other tactical information and use the rules of engagement to either challenge the unidentified combatant 17 or work with known friendly forces to neutralize the threat posed by the unidentified combatant 17.

Just as with the scenario described FIG. 5, the scenario described in FIG. 6 demonstrates how the novel combination of the innovations of the current invention can be used effectively for friendly-force identification and detection of adversaries in the field during a tactical operation. The threat of adversaries or insurgents using stolen or fake uniforms does not just apply to garrison or security checkpoint operations. This threat extends to operations in the field when adversaries or insurgents may be conducting infiltration operations during an engagement. Other combat identification technologies for individual combatants have been described in the prior art. None of these are designed to deal with adversaries or insurgents who are using uniforms or friendly-force technology to pose as friendly forces. The fact that uniforms, equipment and identification systems which are compromised by opposing forces can be used to infiltrate friendly-forces and do great harm has been known for some time. The scenario in FIG. 6 demonstrates how the novel combination of features in the current invention deals with this problem in a unique and effective way. By combining a pass code protected, time-limited, non-visible identification signal 2 which is integrated in the organization's combat uniform, the current invention provides a novel means of intruder detection, even if an adversary's combatants have compromised other friendly equipment or identification systems. In this scenario, the unidentified combatant 16 can be identified as a hostile or friendly from whether the identification signal 2 of this invention is found to be integrated within the combatant's uniform. Even if the unidentified combatant 16 has obtained a friendly IFF system during the battle and is compromising the friendly combat identification system, the soldier 15 can still use the current invention to determine the unidentified combatant's 16 true identification depending on whether the unidentified combatant's uniform displays the proper identification signal 2. This scenario also shows how the current invention can combine the embodiment using a reflective identification signal 2 with the non-visible identification signal 2 of the preferred embodiment. The reflective identification signal 2 which is based on reflection of laser light from existing tactical equipment is an example of adding a 2-way identification method to the 1-way method using the non-visible identification signal 2 of the preferred embodiment. Other 2-way identification systems based on the reflection of visible and non-visible signals are found in the prior art. The embodiment of the current invention which includes a 2-way identification method using a reflective identification signal 2 is a novel combination of a 2-way method with the reflective identification signal 2 that is pass-code protected, time-limited and integrated with the uniform of the unidentified combatant 16, which is not found in the prior art nor known to be used to solve this problem in the field today.

FIGS. 5 and 6 represent typical scenarios demonstrating possible uses for the invention. These scenarios are not intended to be exhaustive examples nor to cover all possible uses of the invention with normal individual combat or other equipment. Other uses and applications for the invention which are not represented by or shown in FIGS. 5 and 6 nor contained within their descriptions will be obvious and apparent by persons skilled in the art after reviewing this disclosure and its description, specifications and claims. It is the intention of this invention that any and all such other uses or applications of the invention are covered within the scope of the invention and are protected by the accompanying claims.

Figure 7:
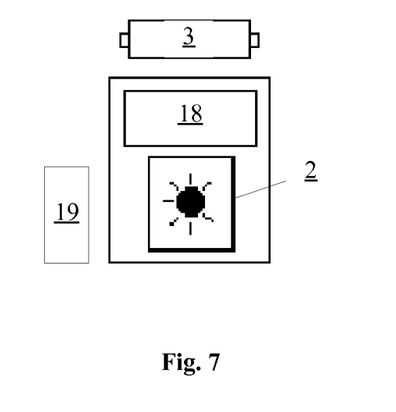
FIG. 7 is an example of embodiments using on-board processor technologies and integrated components for a very small sized embodiment of the invention.
Figure 8:
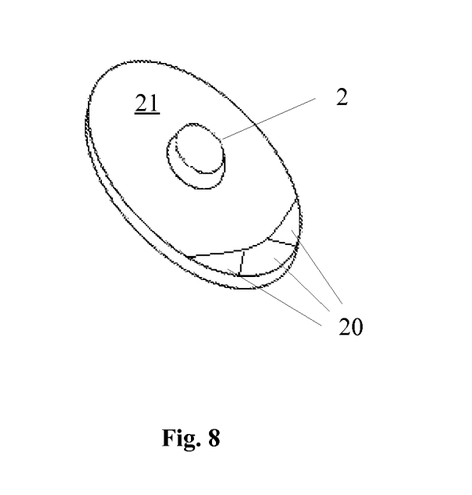
FIG. 8 shows an example of an embodiment based on a very small sized device with the user input devices integrated into a conformal input surface on the device assembly.

FIGS. 7 and 8 show views of the invention which help describe additional embodiments. In FIG. 7, the identification signal 2 is integrated with the processor component of the device which has been implemented as an on-board processor 18. The on-board processor can be a PLD, FPGA or ASIC processor in the embodiment of the invention which uses these technologies. The on-board processor can also be fabricated on the same substrate as a light emitting diode used for the identification signal 2 to integrate these functions using MEMS technology in an alternative embodiment using MEMS technology of for a low-power device. FIG. 7 also includes a power source 3, which can be separate or integrated with the identification signal 2 package, depending on the embodiment. For an embodiment comprising an extremely small or extremely low-power device, the power source 3 can be a small battery which is integrated with the identification signal 2 package. For the low-power embodiment, thermoelectric or piezoelectric MEMS technology which is integrated with the on-board processor 18 and identification signal 2 can be used to allow use of body heat or motion as the power source 3.

FIG. 7 also contains a user input function 19, which can be an user input surface or an interface to an external user input equipment or other system which provides user input. For the extremely small or low-power embodiments, the user interface function 19 can be integrated on-board with the other components of the identification signal 2 package.

FIG. 8 shows one example of how a user input surface 20 can be integrated with the identification signal 2. In this view, 3 buttons are integrated on the identification assembly 21 and are covered with a conformal surface. The user can press on these surfaces in order to use the buttons for entry of his pass code or other required user inputs.

Figure 9:
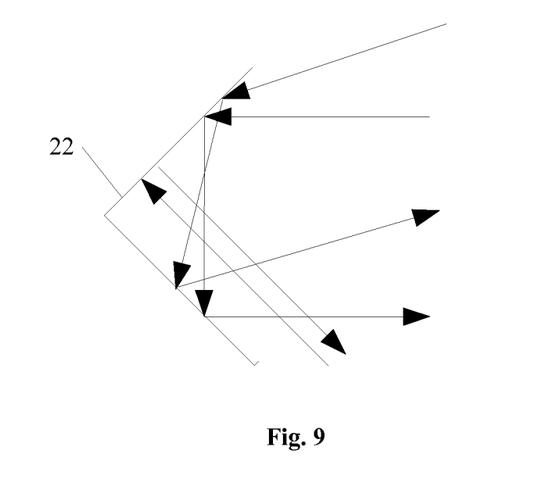
FIG. 9 is an example of how retro-reflective technology can be used for identification with some embodiments of the invention.
Figure 10:
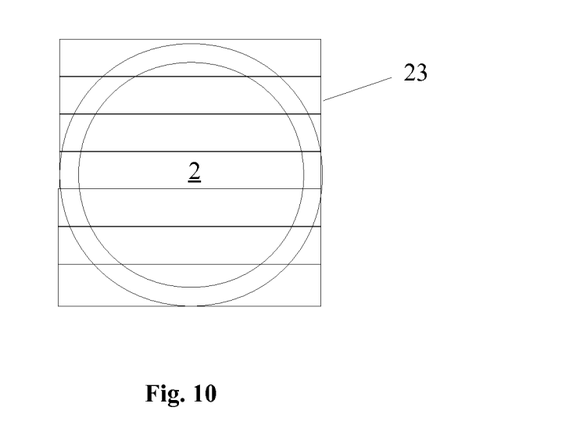
FIG. 10 is an example of how retro-reflective or other reflective technologies can be used with the other features of the invention in some embodiments.

FIGS. 9 and 10 show examples of features supported by the embodiment of the invention which uses reflective surfaces for identification signaling. In FIG. 9, an example of a retro-reflective surface 22 is shown. The embodiment of the invention which uses reflective surfaces can use a retro-reflective surface 22 or simple planar reflective surface for identification. The retro-reflective surface 22 is designed to reflect light at the same angle of incidence as that of the source beam of light, except in the opposite direction. FIG. 9 shows three examples to demonstrate how the example of a retro-reflective surface 22 can reflect a beam of light coming from an external light source. In each case, the beam is reflected one or more times and returns at the same angle of incidence of the original light source but in the opposite direction. This type of reflective surface improves the ability of a person shining a light source on the device to see a return signal and identify the user. By returning the light along the axis of the original source of the light, this type of reflector also limits scattering of the light signal and decreases the probability of intercept in a hostile combat environment. The use of retro-reflective surfaces 22 and other reflective surfaces are found in other identification systems disclosed in the prior art. However, the combination of these types of surfaces or any reflective surfaces as part of a system which is integrated with the user's clothing and provides a pass code protected, time-limited means of identification which allows intruder detection using these reflective surfaces is a novel use of these surfaces for identification which is unique to the current invention.

FIG. 10 shows how the current invention uses a reflective surface such as the retro-reflective surface 22 in one embodiment of the invention with pass code protections and time limits for friendly-force identification and intruder detection. In this embodiment, the identification signal 2 is generated by a retro-reflective surface 22, planar, or other reflective surface. This embodiment combines an electronically controlled window 23 over the identification signal 2. The electronically controlled window 23 is made of a material which will change its transmission properties of light when a voltage is applied by the device. This can include a layer made of smart glass materials including suspended particle, electrochromic, polymer dispersed liquid crystal diode (LCD), or noncrystal materials, or it can be made of thin film LCD, or other materials. The properties for the layer will be chosen so that the transparency of the electronically controlled window 23 can be changed from near fully transparent to completely blocking the visible or non-visible identification signal 2 for the frequency of signals used. The electronically controlled window 23 allows this embodiment to use a low voltage to change the transparency to a level which blocks the identification signal 2 when the device disables the identification function after the timeout has expired or tampering is encountered. Similarly, a low-voltage can be used in this embodiment to change the transparency of the electronically controlled window 23 to near fully transparent after the user enters a pass code to re-enable the identification signal 2. For the low-powered embodiment of the invention, the electronically controlled window 23 can be made of a material which changes its transmission characteristics when a low voltage is applied but retains its transparency setting after the voltage is removed.

The technologies described with the views shown in FIGS. 9 and 10 are included in the prior art. The combination of these technologies to create a novel identification system based on a low-cost, wearable, non-visible, passcode protected, time-limited identification signal which can be used with existing security force equipment is not found in the identification and intruder detection tactics and procedures being used by security force personnel today nor obvious to someone skilled in the art of identification or intruder detection applications.

CITATION LIST

Patent Literature

EP2619558 (A1) Rayner
MX2012010644 (A) Katowski et. al.
MX2012010642 (A) Gray et. al.
U.S. Pat. No. 8,462,042 Delong & Blythe
U.S. Pat. No. 8,184,981 Ivtsenkov et. al.
U.S. Pat. No. 8,135,112 Hughes
U.S. Pat. No. 7,796,733 Hughes
U.S. Pat. No. 8,115,697 Hayles & Omara
U.S. Pat. No. 7,196,655
U.S. Pat. No. 8,111,156 Song
U.S. Pat. No. 7,983,565 Varshneya
U.S. Pat. No. 7,898,385 Kocher
U.S. Pat. No. 7,889,053 Mcgrath & Talukder
U.S. Pat. No. 7,849,619 US2007017136 (A1) Mosher et. al.
U.S. Pat. No. 7,204,425 Mosher et. al.
U.S. Pat. No. 5,973,600 Mosher et. al.
U.S. Pat. No. 7,831,150 Roes et. al.
U.S. Pat. No. 7,308,202 Roes et. al.
U.S. Pat. No. 7,809,109 Mastronardi et. al.
U.S. Pat. No. 7,796,734 Mastronardi et. al.
U.S. Pat. No. 7,593,506 Mastronardi et. al.
U.S. Pat. No. 7,505,562 Mastronardi et. al.
U.S. Pat. No. 7,605,709 Toliver
U.S. Pat. No. 7,494,061 Reinhold
U.S. Pat. No. 7,365,536 Crowley and Lathrop
U.S. Pat. No. 7,316,358 Kotik et. al.
U.S. Pat. No. 7,224,308 Butler
U.S. Pat. No. 6,871,287 Ellingson
U.S. Pat. No. 6,816,106 Butler
U.S. Pat. No. 6,701,649 Brosi
U.S. Pat. No. 6,655,585 Shinn
U.S. Pat. No. 6,593,852 Gutta et. al.
U.S. Pat. No. 6,421,453 Kanevsky et. al.
U.S. Pat. No. 6,119,096 Mann et. al.
U.S. Pat. No. 6,097,330 Kiser
U.S. Pat. No. 6,018,739 Mccoy
U.S. Pat. No. 5,973,598 Beigel
U.S. Pat. No. 5,966,226 Gerber
U.S. Pat. No. 5,819,164. Sun et al.
U.S. Pat. No. 5,686,722 Dobois et al.,
U.S. Pat. No. 5,648,862 Owen
U.S. Pat. No. 5,459,470 Wooton et al.
U.S. Pat. No. 5,414,405 Hogg
U.S. Pat. No. 5,299,227 Rose
U.S. Pat. No. 5,229,764 Matchett et. al.
U.S. Pat. No. 5,274,379 R. Carbonneau et al.
U.S. Pat. No. 5,056,141 Dyke
U.S. Pat. No. 4,955,000 Nastrom
U.S. Pat. No. 4,837,568 Snaper U.S. Pat. No. 4,851,849 Albersdoerfer
U.S. Pat. No. 4,694,297 Alan Sewards,
WO02084324 (A1) Tatum et. al.
WO0133748 (A1) Radomsky
CN102324010 (A) Huaijiang et. al.
US2010219241 (A1) Corwin et. al.
DE202005007113 (U1) Treptow
EP0138525 (A2) Rudland
GB1044443 (A) Atomic Energy Commission
US20120189312 Maryfield et. al.
US20090045996 Ivtsenko
US20060087410 garcia et. al.

NON PATENT LITERATURE

Last, F. M. (Year, Month Date Published). Article title. *Magazine Title*, Page(s). Retrieved from URL.
Dyster, J. (2011, May) Advancements in modular wearable computing solutions for the dismounted warfighter. *Government Security News*, Pages 1-2. Retrieved from http://www.gsnmagazine.com/node/23212.
AFRL Develops Friend-Versus-Foe Identification System. (2008, February) *Wright Patterson Air Force Base News*, Page 1. Retrieve from http://www.wpatb.af.mil/news/story.asp?id:=123085168.
Using Wearable Biometrics for Continuous Automated Authentication. (n.d.) Retrieved Oct. 31, 2013, from http://www.jhuapl.edu/ott/technologies/technology/articles/P02190.asp
High Speed Flash Imaging Laser Vibrometer for the Detection of Suicide Bomber IEDs (SBIEDs). (2010) Retrieved Oct. 26, 2013, from http://www.sbir.gov/sbirsearch/detail/1297.
Compact, wearable IFF laser beacon with enhanced data transmission capability. (2011) Retrieved Oct. 31, 2013, from http://www.sbir.gov/sbirsearch/detail/384083.

What is claimed:

1. A tamperproof identification device comprising:
   an article of clothing;
   a user interface mounted on a substrate for entering a passcode and generating an input signal;
   a processor mounted on the substrate for receiving the input signal from the user interface and verifying the passcode, and for providing an identification signal to verify the validity of a user of the article of clothing;
   a power source coupled to the processor;
   a timer coupled to the processor and substrate to determine an elapsed time from the confirmation of the passcode; and
   an electrically-sensitive thread for securing the substrate and its coupled components to the article of clothing and coupled to the processor wherein the identification signal is only generated when the processor verifies that the entered passcode is valid and the elapsed time determined by the timer has not exceeded a predetermined time, and the electrically-sensitive thread has not detected tampering.

2. The tamperproof identification device in claim 1 further comprising a sensor attached to the article of clothing to sense an emission of an interrogation signal and generating the identification signal in response to sensing the interrogation signal wherein the processor disables the return signal if the processor determines that the interrogation signal is not valid or not received.

3. The tamperproof identification device in claim 1 further comprising a visual indicator coupled to the processor to provide an alert that the processor is not providing the identification signal.

4. The tamperproof identification device in claim 1 wherein the user interface is a keyboard.

5. The tamperproof identification device in claim 1 wherein the article of clothing is part of a uniform.

6. The tamperproof identification device in claim 5 wherein the identification signal is infrared light.

7. The tamperproof identification device in claim 5 wherein the identification signal is ultraviolet light.

8. The tamperproof identification device in claim 5 wherein the identification signal is visible light.

9. The tamperproof identification device in claim 5 wherein the identification signal is a change in the reflectivity of a portion of the uniform.

10. The tamperproof identification device in claim 1 wherein the user interface is a fingerprint reader and the passcode is a fingerprint of the user.

11. The tamperproof identification device in claim 1 wherein the electrically-sensitive thread traverses an arc surrounding the substrate and the coupled components so that tampering is detected when the thread is broken.

12. A method of identifying friendly forces comprising:
   attaching the tamperproof identification device in claim 1 to a person;
   entering by the person the passcode and verifying the passcode;
   determining if the elapsed time after confirmation of the passcode has not exceeded the predetermined time;
   transmitting the identification signal at the article of clothing if the entered passcode is verified by the processor and determined to be valid and the elapsed time determined by the timer has not exceeded a predetermined time, and the electrically-sensitive thread has not detected tampering; and
   receiving the transmitted signal from the article of clothing and identifying the person as friendly forces if the received signal is verified to be valid.

13. The method of identifying friendly forces in claim 12 further comprising detecting an interrogation signal at the article of clothing and enabling the transmission of the identification signal only if the interrogation signal is valid.

14. The method of identifying friendly forces in claim 12 wherein the received signal is verified by a sentry to determine if access to a location should be granted.

* * * * *